(12) United States Patent
Vernia

(10) Patent No.: US 6,669,120 B2
(45) Date of Patent: Dec. 30, 2003

(54) UNIVERSAL HEAD FOR FIXING A NOZZLE TO A FLUID DISTRIBUTION DUCT

(75) Inventor: Marco Vernia, Rubiera (IT)

(73) Assignee: Arag - S.R.L. Con Socio Unico, Rubiera (IT)

( * ) Notice: Subject to any disclaimer, the term of this patent is extended or adjusted under 35 U.S.C. 154(b) by 0 days.

(21) Appl. No.: 10/146,880

(22) Filed: May 17, 2002

(65) Prior Publication Data

US 2002/0175229 A1 Nov. 28, 2002

(30) Foreign Application Priority Data

May 25, 2001 (IT) ................................. MO201A0106

(51) Int. Cl.$^7$ ................................................. B05B 1/00
(52) U.S. Cl. ................ 239/600; 239/542; 239/548; 239/601; 239/DIG. 12; 285/319; 285/360
(58) Field of Search ................ 239/600, 597, 239/442, 533.13, 542, 548, 565, 602, 601, DIG. 12; 285/319, 320, 360, 361

(56) References Cited

U.S. PATENT DOCUMENTS

| | | | |
|---|---|---|---|
| 5,125,578 A | | 6/1992 | Ballu |
| 5,146,880 A | * | 9/1992 | Mayne ........................ 239/600 |
| 5,190,224 A | | 3/1993 | Hamilton |
| 5,253,807 A | * | 10/1993 | Newbegin .................... 239/600 |
| 5,326,036 A | | 7/1994 | Wilger |
| 5,421,522 A | * | 6/1995 | Bowen ........................ 239/600 |
| 5,626,371 A | * | 5/1997 | Bartholomew .............. 285/319 |
| 5,727,739 A | | 3/1998 | Hamilton |
| 6,079,638 A | | 6/2000 | Chang |
| 6,257,626 B1 | * | 7/2001 | Campau ..................... 285/320 |
| 6,305,724 B1 | * | 10/2001 | Sampson .................... 285/361 |

FOREIGN PATENT DOCUMENTS

EP  0 279 992  8/1988

* cited by examiner

Primary Examiner—Dinh Q. Nguyen
(74) Attorney, Agent, or Firm—Guido Modiano; Albert Josif; Daniel O'Byrne

(57) ABSTRACT

A universal head for fixing a nozzle to a fluid distribution duct comprises a cap-like sleeve adapted to be associated with the outlet of the duct, a nozzle insertion slot formed at the top of the sleeve, and wings for locking the nozzle that can expand radially and are formed proximate to the slot.

14 Claims, 2 Drawing Sheets

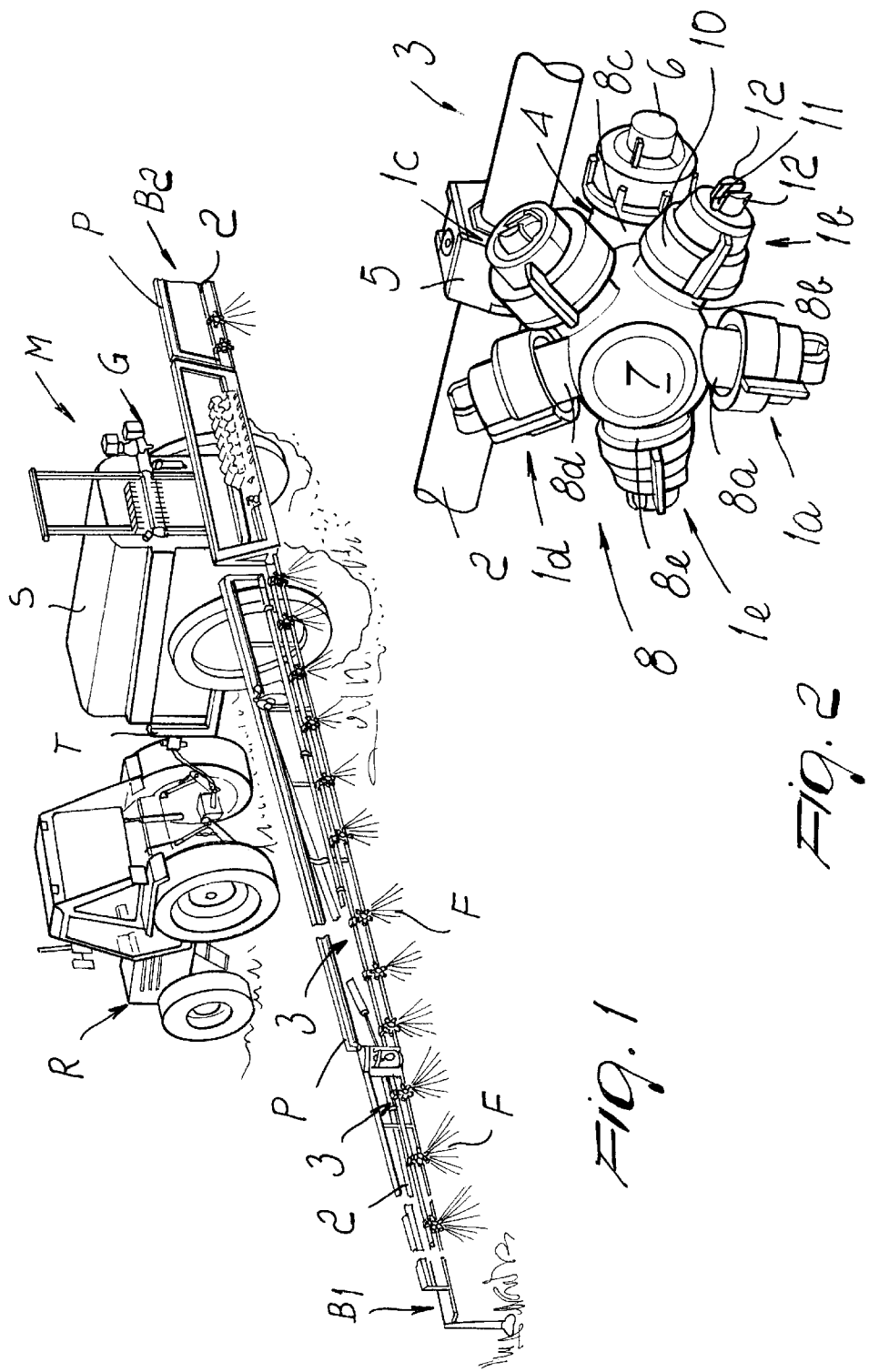

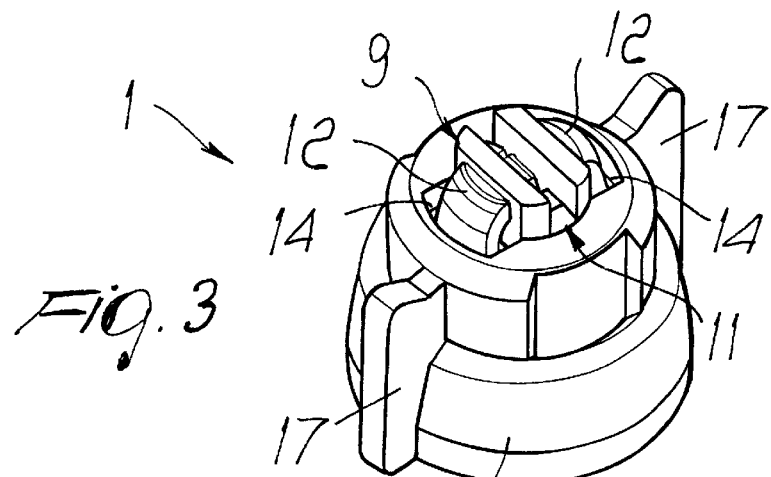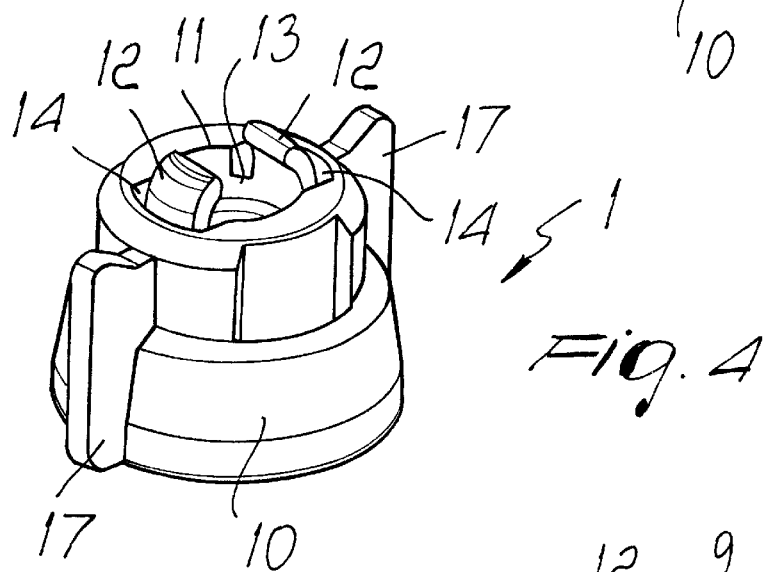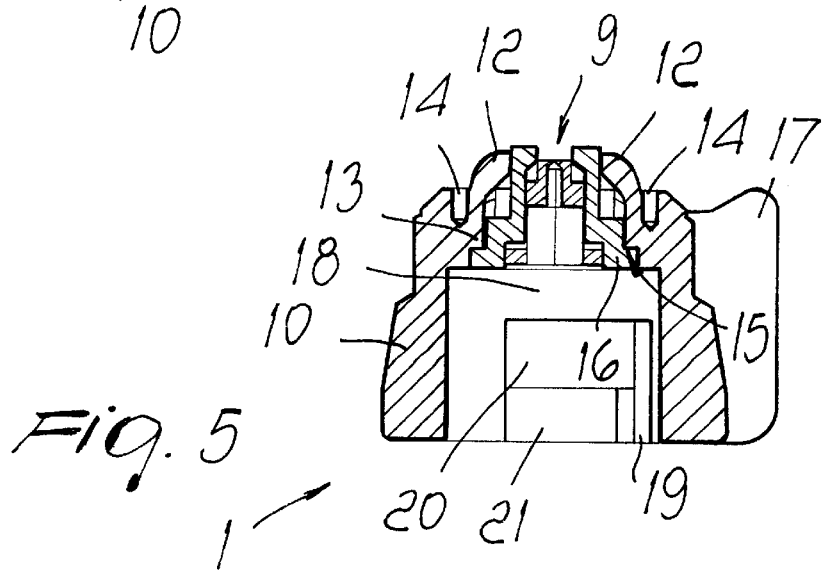

UNIVERSAL HEAD FOR FIXING A NOZZLE TO A FLUID DISTRIBUTION DUCT

BACKGROUND OF THE INVENTION

The present invention relates to a universal head for fixing a nozzle to a fluid distribution duct.

In the agricultural field, spraying machines are known which are used to distribute fluid products for herbicidal, fungicidal, insecticidal treatments or the like.

Spraying machines are substantially constituted by a chassis that supports a tank for the fluid and a pumping assembly, which is associated with the tank and feeds the fluid into one or more sprayer bars used for distribution; the spraying machines are fixed or towed by a tractor that travels along the crop to be treated.

The sprayer bars, which are horizontal for herbaceous crops or vertical or arc-like for arboreal crops, are constituted by a supporting frame that is associated with the chassis, and fluid conveyance tubes are fixed thereto which have means for adjusting, distributing, controlling and dispensing the fluid.

The dispensing means are constituted by nozzle holders with one or more outlets, i.e., by connectors (ducts) for branching from the conveyance tubes which branch into one or more distribution ducts which are selectively active, the outlet of each duct being rigidly coupled to a different fluid nebulization nozzle.

In order to couple the nozzles to the outlets of the distribution ducts fixing heads are used, each of which is constituted by a cap at the top of which a slot for inserting a nozzle is provided and inside which a seat for accommodating a sealing gasket is provided; the cap is screwed or interlocked onto the outer lateral surface of the respective duct.

The various fluid products (herbicides, fungicides, insecticides and the like) have different physical and chemical properties and must be distributed in mutually different doses and manners; accordingly, each treatment might require the use of a different nozzle type.

Accordingly, there is a wide range of models of nozzles whose constructive characteristics are considerably different from each other in terms of structure, shape and dimensions and are adapted to nebulize the fluids into jets of several shapes and ranges.

Every currently known fixing head is provided with a single slot, which is shaped and sized for the insertion of a specific nozzle model; alternatively, fixing heads are known at the slot of which notches are provided that allow to insert at the most two different nozzle models.

Disadvantageously, therefore, every nozzle model requires the use of a different fixing head.

This causes a plurality of drawbacks, including the fact that the manufacture of multiple fixing head models requires the use of multiple different molds, the adoption of systems for differentiating and identifying the various models (such as e.g. a different identification code), and the establishment and management of multiple inventory reserves.

Another disadvantage consists in that end users (farmers) also have to create their own personal inventory by purchasing a wide range of fixing heads according to the different nozzles that they normally use in performing their activities.

This, accordingly, entails an onerous increase in the costs incurred by end users and a complication of the operations that they have to perform in order to prepare the spraying machines: they must in fact pay particular attention to pairing the correct head model with the nozzle type used.

Finally, another disadvantage consists in that between the head insertion slot and the respective nozzle there is always a significant play that does not allow perfect immobilization of said nozzle.

SUMMARY OF THE INVENTION

The aim of the present invention is to eliminate the drawbacks noted above of conventional fixing heads by providing a universal head for fixing a nozzle to a fluid distribution duct that allows to stably fix a large number of nozzle models and to eliminate the play between the insertion slot and said nozzle, allows to simplify the manufacturing process, to reduce reserves and facilitate inventory management for manufacturers and end users, and is immediately recognizable and easy to use on the part of said end users.

Within this aim, an object of the present invention is to achieve the above aim with a structure that is simple, relatively easy to provide in practice, safe in use, effective in operation, and relatively low in cost.

This aim and this and other objects that will become better apparent hereinafter are achieved by the present universal head for fixing a nozzle to a fluid distribution duct, comprising a cap-like sleeve that is adapted to be associated with the outlet of said duct and a nozzle insertion slot formed at the top of said sleeve, characterized in that it comprises means for locking said nozzle that can expand radially and are formed proximate to said slot.

BRIEF DESCRIPTION OF THE DRAWINGS

Further characteristics and advantages of the present invention will become better apparent from the detailed description of a preferred but not exclusive embodiment of a universal head for fixing a nozzle to a fluid distribution duct, illustrated only by way of non-limitative example in the accompanying drawings, wherein:

FIG. 1 is a schematic perspective view of an agricultural spraying machine provided with heads according to the invention;

FIG. 2 is an enlarged-scale schematic view of a detail of the spraying machine of FIG. 1;

FIG. 3 is a schematic perspective view of a head according to the invention in which a nozzle is inserted;

FIG. 4 is a schematic perspective view of the head of FIG. 3 without the nozzle;

FIG. 5 is a schematic longitudinal sectional view of the head of FIG. 3.

DESCRIPTION OF THE PREFERRED EMBODIMENTS

With reference to the figures, the reference numeral 1 generally designates a universal head for fixing a nozzle to a fluid distribution duct, particularly of the type for herbicidal, fungicidal, insecticidal treatments or the like, spread onto herbaceous or arboreal crops by spraying machines M.

The spraying machine M, of a conventional type, is substantially constituted by a chassis T that supports a tank S for the fluid F that is associated with a pumping assembly G that feeds two horizontal and mutually opposite sprayer bars B1 and B2, which are designed to distribute the fluid F on herbaceous crops.

The spraying machine M is fixed to the rear of a tractor R, which travels along the crop to be treated.

The bars B1 and B2 are constituted by a supporting frame P, which is associated with the chassis T and to which tubes 2 for conveying the fluid F are fixed; said tubes are fed by the assembly G, and adjustment and distribution valves, control means and dispensing means 3 for the fluid F are distributed along said tubes.

The dispensing means 3 are constituted by nozzle holders with one or more outlets, five outlets in the illustrated case, each of which is constituted by a body 4 for connection and branching from the tubes 2, to which it is coupled by means of a straddling coupling 5 that has an antidrip device 6.

A carousel 7 is rotatably associated with the body 4 and branches into five selectively active distribution ducts 8, specifically 8a, 8b, 8c, 8d and 8e; the rotation of the carousel 7 in fact connects to the tube 2 only the lower duct 8a, excluding the remaining ducts 8.

The outlet of each duct 8 is rigidly coupled to a respective fluid atomization nozzle 9 by means of a respective fixing head 1a, 1b, 1c, 1d and 1e.

Depending on the treatment to be distributed, the model, shape and dimensions of the nozzles 9 to be used may vary, but these characteristics of the heads 1 do not. For the sake of simplicity, in FIG. 2 the heads 1 are shown rigidly coupled to the respective ducts 8 but without the nozzles 9.

Each head 1 is constituted by a cap-like sleeve 10, which is associated with the outlet of the duct 8, to which it is rigidly coupled by way of interlocking or threaded coupling means of a conventional type.

A slot 11 for inserting the nozzle 9 is formed at the top of the sleeve 10.

Proximate to the slot 11 locking means for locking the nozzle 9 are provided which can expand radially and are constituted by two elastic longitudinal and diametrically opposite wings 12, between which the nozzle 9 is inserted.

An annular base 13 is formed inside the sleeve 10 and at a lower part of the slot 11, and the lower ends of the wings 12 are rigidly coupled thereto.

The upper ends of the wings 12 protrude freely outside the slot 11 and are adapted to wrap around the nozzle 9 inserted therein and lock it.

Conveniently, between the inner edge of the slot 11 and the outer surface of the wings 12 there is a play or gap 14 whose extent allows the outward radial expansion of the wings 12 following the insertion of the nozzle 9.

Moreover, an annular surface 15 for the abutment of a retention collar 16, formed at the lower base of the nozzle 9, is provided under the annular base 13 and inside the sleeve 10.

The reference numeral 17 designates two grip tabs, which are formed on the outer surface of the sleeve 10 and are adapted to facilitate the assembly and disassembly of the head 1 with respect to the duct 8, and the reference numeral 18 designates the seat for a gasket for providing a seal to the fluid F.

The means for coupling the head 1 to the duct 8 are constituted by a pair of locking pins, not shown, which are provided so as to protrude and be diametrically opposite on the outer lateral surface of the duct 8 and can be inserted in corresponding slots 19 which are connected to locking grooves 20 formed at the base of the sleeve 10; the reference numeral 21 designates a stop locator, which is adapted to prevent, by forming an obstacle, the uncoupling of the head 1 from the duct 8.

The operation of the invention is as follows.

The outlets of the ducts 8 are associated with respective nozzles 9, optionally of different models, by using universal fixing heads 1, which are mutually identical and independent of the nozzle models used.

Each nozzle 9 is inserted between the wings 12 of the respective head 1 until the collar 16 abuts against the annular surface 15; the upper ends of the wings 12, being of the elastic type, expand radially outward, adapting to the shape of the nozzle 9 and locking it.

It is noted that in this manner the nozzle 9 is fixed stably between the wings 12 and no play remains between the coupled parts.

After inserting a gasket in the seat 18, the head 1 is rigidly coupled to a duct 8, whose outlet is thus connected to the nozzle 9.

The carousel 7 allows to connect to the tube 2 the duct 8 on which the nozzle 9 adapted to dispense the fluid F is mounted.

In practice it has been found that the described invention achieves the intended aim and objects, i.e., it provides a universal head for fixing a nozzle to a fluid distribution duct that allows to fix, in a simple and stable manner, any nozzle model among those known in the field.

The head according to the invention therefore allows to simplify manufacturing cycles, to reduce reserves and to simplify inventory management, and is immediately recognizable and usable by end users, who no longer need to purchase a different head model for each nozzle model they use.

The invention thus conceived is susceptible of numerous modifications and variations, all of which are within the scope of the appended claims.

All the details may further be replaced with other technically equivalent ones.

In practice, the materials used, as well as the shapes and the dimensions, may be any according to requirements without thereby abandoning the protective scope of the appended claims.

The disclosures in Italian Patent Application No. MO2001A000106 from which this application claims priority are incorporated herein by reference.

What is claimed is:

1. A universal head for fixing a nozzle to a fluid distribution duct; comprising:

a cap-like sleeve shaped so as to be connectable with an outlet of the fluid distribution duct;

a nozzle insertion slot formed at a top part of said sleeve; and locking means formed proximate to said slot for locking said nozzle in the slot, said locking means comprising at least one pair of substantially longitudinal and diametrically opposite elastic wings that are radially expandable and arranged so as to allow insertion of said nozzle therebetween, said wings comprising each a lower end which is rigidly coupled to said cap-like sleeve proximate to said slot, and a free upper end which is shaped so as to wrap around and lock said nozzle in said slot.

2. The head of claim 1, wherein said sleeve comprises an inner annular base, which is formed at a lower part of said slot, and to which the lower ends of the wings are rigidly coupled.

3. The head of claim 1, further comprising a play for allowing wing expansion, provided between said slot and said wings, the upper ends of the wings protruding outside said slot.

4. The head of claim 3, further comprising: a retention collar formed at the lower base of the nozzle; and an annular surface provided inside said sleeve for abutment of said retention collar.

5. The head of claim 4, wherein said annular abutment surface is formed below said annular base.

6. A universal head for fixing a nozzle to a fluid distribution duct, comprising:

a cap-like sleeve having a top part and a bottom part, said sleeve being shaped so as to allow accommodation therein of the nozzle upon insertion the nozzle through said bottom part and to be connectable at said bottom part thereof with an outlet of the fluid distribution duct;

a nozzle insertion slot fanned at a top part of said sleeve; and locking means formed proximate to said slot for locking said nozzle in the slot, said locking means comprising at least one pair of substantially longitudinal and diametrically opposite elastic wings that are radially expandable and arranged so as to allow, upon accommodation of the nozzle inside said sleeve, insertion of the nozzle therebetween, said wings comprising each a lower end which is rigidly coupled to said sleeve proximate to said slot, and a free upper end which is shaped so as to wrap around and lock said nozzle in said slot.

7. The head of claim 6, wherein said sleeve comprises an inner annular base, which is formed at a lower part of said slot, and to which the lower ends of the wings are rigidly coupled.

8. The head of claim 6, further comprising a play for allowing wing expansion, provided between said slot and said wings, the upper ends of the wings protruding outside said slot.

9. The head of claim 8, further comprising: a retention collar formed at the lower base of the nozzle; and an annular surface provided inside said sleeve for abutment of said retention collar.

10. The head of claim 9, wherein said annular abutment surface is fanned below said annular base.

11. A universal head for fixing a nozzle to a fluid distribution duct, comprising:

a cap-like sleeve shaped so as to be connectable with an outlet of the fluid distribution duct;

a nozzle insertion slot formed at a top part of said sleeve; and locking means formed proximate to said slot for locking said nozzle in the slot, said locking means comprising at least one pair of substantially longitudinal and diametrically opposite elastic wings that are radially expandable and arranged so as to allow insertion of said nozzle therebetween, said wings comprising each a lower end which is rigidly coupled to said cap-like sleeve proximate to said slot, and a free upper end which is shaped so as to wrap around and lock said nozzle in said slot;

and wherein said sleeve comprises an inner annular base formed at a lower part of said slot, the lower ends of the wings being rigidly coupled to said annular base.

12. The head of claim 11, further comprising a play for allowing wing expansion, provided between said slot and said wings, the upper ends of the wings protruding outside said slot.

13. The head of claim 12, further comprising: a retention collar formed at the lower base of the nozzle; and an annular surface provided inside said sleeve for abutment of said retention collar.

14. The head of claim 13, wherein said annular abutment surface is formed below said annular base.

* * * * *